United States Patent [19]
Powrie et al.

[11] Patent Number: 5,922,382
[45] Date of Patent: Jul. 13, 1999

[54] PREPARATION AND PRESERVATION OF FRESH, VITAMINIZED, FLAVORED AND UNFLAVORED CUT APPLE PIECES

[75] Inventors: William Duncan Powrie, North Vancouver; Chiu Hui Wu, Vancouver, both of Canada

[73] Assignee: The University of British Columbia, Vancouver, Canada

[21] Appl. No.: 08/745,944

[22] Filed: Nov. 8, 1996

Related U.S. Application Data

[30] Foreign Application Priority Data

Nov. 8, 1995 [CA] Canada ................................. 2162425

[51] Int. Cl.$^6$ ............................ B65D 85/50; A23L 2/06
[52] U.S. Cl. ..................... 426/324; 426/262; 426/268; 426/270; 426/326; 426/327; 426/335; 426/321; 229/3.5 R; 549/315
[58] Field of Search ................................. 426/324, 262, 426/268, 270, 326, 327, 335, 321; 229/3.5 R; 549/315

[56] References Cited

U.S. PATENT DOCUMENTS

| | | |
|---|---|---|
| 3,754,938 | 8/1973 | Ponting . |
| 4,011,348 | 3/1977 | Farrier et al. . |
| 4,895,729 | 1/1990 | Powrie et al. . |
| 4,988,522 | 1/1991 | Warren . |
| 5,268,054 | 12/1993 | Bakhos . |
| 5,575,418 | 11/1996 | Wu et al. . |
| 5,603,952 | 2/1997 | Sopher . |

FOREIGN PATENT DOCUMENTS

| | | |
|---|---|---|
| 59-6834 | 1/1984 | Japan . |
| 3-80044 | 4/1991 | Japan . |
| 4-11860 | 1/1992 | Japan . |
| 9101063 | 4/1991 | Sweden . |
| WO 9208361 | 5/1992 | WIPO . |
| WO 9412041 | 6/1994 | WIPO . |

OTHER PUBLICATIONS

Powrie and Skura, "Modified Atmosphere Packaging of Fruits and Vegetables", Ellis Horwood, 1991, p. 206.

Kim, Smith & Lee, "Quality of Minimally Processed Apple Slices from Selected Cultivars", J. Food Sci. 58, 1115, 1993.

Labuza and Breene, "Applications of 'Active Packaging' for Improvement of Shelf–Life and Nutritional Quality of Fresh and Extended Shelf–Life Foods", J. Food Process. Preserv. 13, 1, 1989.

Ponting, Jackson and Walters, "Refrigerated Apple Slices: Preservative Effects of Ascorbic Acid, Calcium and Sulfites", J. Food Sci. 37, 434, 1972.

O'Beirne, "Some Effects of Modified Atmosphere Packaging and Vacuum Packaging in Combination with Antioxidants on Quality and Storage–Life of Ready–to–use Chilled Apple Slices", Processing and Quality of Foods, vol. 3, Elsevier Applied Science, 1989.

*Primary Examiner*—Jeffrey Stucker
*Assistant Examiner*—Phuong T Bui
*Attorney, Agent, or Firm*—Oyen Wiggs Green & Mutala

[57] ABSTRACT

This invention relates to a novel method of preserving fresh cut fruit for a prolonged period of time. More particularly, this invention is directed to a novel method of preparing and preserving fresh, vitaminized flavored or unflavored cut apple pieces to be stored in containers for extended periods of time of up to 6 weeks at refrigerated temperatures with the retention of acceptable naturally-occurring and adjunctive flavors, crisp texture and original whiteness or yellowness, being free of enzymatic browning. A method of preserving fresh apple pieces comprising: (a) sanitizing the surfaces of whole apples with a suitable sanitization agent; (b) coring and cutting the peeled or unpeeled apples into pieces; (c) immersing the apple pieces in an acid solution containing between about 5 to about 15% weight ascorbic acid; (d) removing excess solution from the surfaces of the apple pieces; (e) depositing a flavorant on the surfaces of the apple pieces in a container or placing previously-flavored apple pieces in a container; and (f) quick-chilling the apple pieces and storing the container of apple pieces at a temperature between about 0° C. and about 10° C.

10 Claims, No Drawings

PREPARATION AND PRESERVATION OF FRESH, VITAMINIZED, FLAVORED AND UNFLAVORED CUT APPLE PIECES

FIELD OF THE INVENTION

This invention relates to a novel method of preserving fresh fruit for a prolonged period of time. More particularly, this invention is directed to a novel method of preparing and preserving fresh, vitaminized, flavoured or unflavored cut apple pieces to be stored in containers for extended periods of time of up to six weeks at refrigerated temperatures with the retention of acceptable naturally-occurring and adjunctive flavors, crisp and crunchy texture and original whiteness or yellowness, being free of enzymatic browning. The apple pieces are to retain their original whiteness or yellowness for about one week at about 0° C. to 6° C. after the containers are opened to the air.

BACKGROUND OF THE INVENTION

Fresh ripe fruits are considered by consumers as the ultimate in aroma, flavour, texture and colour. The enjoyable culinary experience of fresh fruits can be attributed to the pleasant balance of sweetness and sourness, the desirable textural firmness and crunchiness, and the richness in flavour notes. From the standpoint of ease of serving and eating, whole fruits are frequently peeled, cored, destoned, deseeded, segmented, sliced and diced in the home and in food service establishments. Packaged, pre-cut fresh fruits are appealing to consumers and food service operators with the benefits of ready-to-use convenience, freshness, fullness of natural flavour, storability and no waste.

Packaged, fresh cut apple pieces could be a year-round item in the marketplace since whole fresh apples can be stored for up to ten months under controlled atmosphere (CA) conditions, and since apple imports are available at other times. For the successful retail and food service marketing of packaged fresh cut apple pieces, the high quality attributes of the cut apple pieces must be retained during storage in containers for periods up to six weeks at refrigerated temperatures. Further, value-added features such as adjunctive flavours and nutrient supplementation would be consumer-appealing for the cut apple items. Such cut apple pieces could be used as a snack, as an ingredient for mixed fruit salads, cakes, tarts, pies and dessert topping or for juice preparation.

The ascorbic acid content of common apple cultivars at harvest is between 2 and 11 mg per 100 grams, which is considered to be one serving of slices. Ascorbic acid supplements would be nutritionally beneficial to bring the level up to at least 60 mg per serving of apple pieces, 60 mg being the recommended daily intake for vitamin C in Canada and the U.S.A.

Further, since consumer appeal is towards food products with no or few food additives, the ascorbic acid (erythorbic acid as an alternative) and the adjunctive flavour ingredients (preferably natural) are to be the only food additives for inclusion in cut apple pieces under the conditions of this invention.

Edible apple tissue consists essentially of interconnected parenchyma cells. The pectic substances (protopectin) in the middle lamella between the cells provide cell—cell adhesion, the adhesion strength being related to tissue firmness and crispness. Turgid parenchyma cells with high osmotic pressures contribute to the textural characteristics of crunchiness of apple tissue. In the mature apple parenchyma tissue, about 20 to 25% of the total volume is made up of intercellular gas spaces. When apple slices are immersed in an anti-browning solution containing ascorbic acid or sulfite, the fluid migrates into the tissue through these intercellular spaces. In the vacuum infiltration technique for the rapid penetration of anti-browning solutions into apple slices, the intercellular gas withdrawn from the apple tissue is displaced by the solution. The shortcoming of such a technique is the creation of undesirable water-logged apple slices.

During the coring, peeling and slicing of whole apples, the mechanical shearing of the parenchyma tissue brings about the rupture of cells, bruising of tissue and decompartmentalization of cellular components (Powrie and Skura, 1991, in Modified Atmosphere Packaging of Food, Ellis Horwood). Such tissue alterations lead to quality deteriorative changes such as:

1. increase in respiration rate;
2. acceleration in ripening and senescence;
3. reduction is tissue firmness and crispness;
4. enhanced enzymatic browning; and
5. increased susceptibility to microbial invasion and deterioration.

When whole apples with respiration rates in the vicinity of 1 mL $CO_2$/kg/hr. at 0° C. are cut into slices, the rate of respiration increases considerably and is cultivar-dependent. Kim, Smith and Lee (J. Food Sci. 58, 1115, 1993) reported that the initial respiration rates for cut apple slices at 2° C. from 12 cultivars varied from 3.5 to 7.6 mL $CO_2$/kg/hr. During a 3-day storage period, the respiration rates of these apple slices decreased, but thereafter, only small changes were noted over a 9-day period at 2° C. The acidity of these apple slices decreased progressively over a 12-day storage period at 2° C., presumably due to the respiratory catabolism of the organic acids. Labuza and Breene (J. Food Process. Preserv. 13, 1, 1989) pointed out that the respiration rate of a fresh commodity is related to the level of rapidity of quality deterioration. For high quality retention of cut apple pieces, the respiration rate should be reduced.

When cut apple pieces are exposed to air, the browning of the tissue surfaces becomes apparent within a few hours, and increases over a 2 to 3-day period. The browning is caused by the enzymatic conversion of phenols to quinones, and subsequent non-enzymatic reactions to form brown-coloured melanin polymers. Enzymatic browning of cut apple slices has been controlled industrially by the treatment of the slices with sulfites in solution through the inhibition of polyphenol oxidase activity and reduction of quinones to phenols. Since sulfites can bring about acute allergic reaction in some consumers, some governmental regulatory agencies (e.g. U.S. Food and Drug Administration) have banned the use of sulfites for fresh salad fruits and vegetables. L-ascorbic acid and D-araboascorbic acid (D-erythorbic acid), as reducing agents, can be used as sulfite replacements for inhibiting enzymatic browning of cut apple pieces. Citric acid and calcium salts are used frequently in conjunction with these reducing agents to enhance the inhibitory action. Ascorbic and erythorbic acids interrupt the chemical reaction sequence for browning in cut apples by reducing ortho-quinone compounds to dihydroxyphenolic forms. Citric acid can lower the pH below the optimum level (pH 6.2) of polyphenol oxidase activity. Research reports have indicated that a calcium salt (0.1%) in combination with ascorbic acid (1%) in solution effectively reduced enzymatic browning in apple slices (Ponting, Jackson and Walters, J. Food Sci. 37, 434, 1972). Ascorbic acid or erythorbic acid in the treatment solution for fresh apple slices are usually at levels of up to 1.5% with accompanying supplementary browning inhibitors. Vacuum and pressure infiltration have been used to infuse the browning inhibitors into the tissue of apples. However, such physical treatment causes water-logging. It is apparent that, to impede enzymatic browning of fresh cut apple pieces, treatments to lower pH below the optimum pH of polyphenol oxidase, and to reduce quinones, are minimally essential.

Research results have shown that when apples are cut into slices, the firmness decreases steadily during refrigerated storage. Kim, Smith and Lee (J. Food Sci. 58, 1115, 1993) indicated that, over a 12-day storage period at 2° C., the firmness of apple slices from 12 cultivars decreased by 15.5 to 52.9%. The reduction of slice firmness can be attributed to the breakdown of intercellular and cellular pectic substances. Retention of firmness, crunchiness and crispness of cut apple pieces is dependent on the restriction of ripening and senescence, and the retention of the cellular turgor. Exopolygalacturonase is an enzyme involved in the breakdown of intercellular and cellular pectic substances in ripe apples. Ethylene, the ripening hormone in the apple, triggers the synthesis of this enzyme. The synthesis of ethylene in cut apple pieces can be impeded by $CO_2$ infusion into the tissue.

During the storage of cut apple pieces, cytoplasmic fluid may exude from the parenchyma tissue onto the cut surfaces. The fluid, derived mostly from the vacuoles of the cells, contains organic acids, sugars and minerals which can be utilized as nutrients for microbial growth. Studies have shown that the vacuolar fluid (juice) of apples is a suitable medium for the growth of yeast, mold lactic acid bacteria and acetic acid bacteria. To preserve the high quality of cut apple pieces for periods up to 6 weeks, microbial growth inhibition through the utilization of impact extrinsic parameters is imperative.

Considerable information has been published on the advantages of modifying the atmosphere around whole fruits to prolong the shelf-life and maintain the fresh quality (Powrie and Skura, in Modified Atmosphere Packaging of Food, Ellis Harwood, 1991). A modified atmosphere is a gas mixture which has a composition different than that of air. Specific levels of oxygen and carbon dioxide surrounding fruits can inhibit the respiration rate, ripening, senescence and microbial growth. Apples in a controlled modified atmosphere of about 2% oxygen and 2% carbon dioxide can be stored for up to 10 months and retain acceptable quality characteristics.

The effectiveness of polymeric plastic films as package material for extending the shelf-life of fresh whole fruits, including apples, with an equilibrium modified atmosphere in the headspace of a sealed package, has been reported. This processing methodology is called modified atmosphere packaging (MAP).

Package systems can be designed to maintain the quality attributes of fresh cut fruit pieces for prolonged storage under modified atmosphere packaging (MAP) conditions. The invention of Powrie, Wu and Skura (U.S. Pat. No. 4,895,729) discloses a MAP method for preparing and preserving fresh, ripe, cut fruit pieces in high gas barrier or gas impermeable container with an input of a specified gas mixture into the headspace prior to sealing. Cut apple pieces can be preserved under the methodology of this patented invention with many of the quality attributes of fresh apple tissue being maintained. However, during the storage of the cut apple pieces, the carbon dioxide content increases to a point where some fizziness (carbonated taste) is perceived. With an extended storage period, the cut apple pieces attain a slight off-flavour. Although the stored cut apple pieces with these quality aberrations were acceptable, the absence of these properties would elevate considerably the sensory score to superior quality.

O'Beirne (Processing and Quality of Foods, Vol. 3, Elsevier Applied Science, 1989) outlined a combination process of modified atmosphere packaging/vacuum packaging, dipping in an ascorbic acid solution (0.5 to 1% ascorbic acid, 1% citric acid and 0.5% calcium chloride) and chilled storage (5° C.) for extending the shelf-life of apple slices. The packaging material was a high gas barrier polymer laminate and the input gases were oxygen-free nitrogen and 50% nitrogen—50% carbon dioxide mixture. With the oxygen-free microatmospheres in the headspace of the containers, the fresh apple slices could be stored for 2 to 3 weeks with acceptable colour and flavour, but became insipid thereafter. With the 1% ascorbic acid, 1% citric acid with 0.1% calcium chloride dip solution, the % free liquid (drip) after 21 days of storage of slices was reported to be between 2.8 and 8.1, depending on the headspace input gas composition.

U.S. Pat. No. 3,754,938, Ponting, Aug. 28, 1973, discloses a process whereby the quality of apple slices is preserved for an extended period of time by the synergistic effect of a treatment solution (pH 7 to 9) consisting of ascorbic acid, calcium chloride and sodium bicarbonate. Treatment with said solution eliminates the use of any sulfiting agent in a process for the preservation of apple slices.

U.S. Pat. No. 4,011,348, Farrier et al., Mar. 8, 1977, discloses a process whereby raw fruits and vegetables are treated with an aqueous solution having a pH between about 4 and 7.5 and containing a selected ascorbate ion concentration in order to maintain desirable colour, texture, odour and flavour characteristics when the fruit and vegetables are stored at aerobic refrigeration conditions for extended periods.

Swedish Patent No. 91-01063, Lundholm, discloses packing fresh, peeled apples with 90 to 95% nitrogen. The process involves coring fruit and placing it in hermetic packing from which air is evacuated prior to filling with nitrogen. An inert gas can be added to the nitrogen, with the total volume of nitrogen alone or nitrogen plus inert gas being up to 90 to 95% of the total gas volume. Once the gas is added, the package is tightly closed. The apples or apple pieces are treated with a food acid, such as ascorbic acid or citric acid, before being placed in the package. They are also blanched. The filled and sealed package is stored at a temperature of preferably 4 to 8° C. until use. The added inert gas or gases amount to approximately 10 vol. %, calculated on the nitrogen content, helium or argon being used. The package itself is opaque.

Japanese Patent No. 4011860, Naganoken Noson Kog, Jan. 16, 1992, discloses a process whereby slices of apple or other fruit are preserved by rapidly immersing the apples or fruit in an aqueous solution of ascorbic acid and packaging in plastic film. The inside of the package is evacuated and $N_2$ gas is introduced.

Japanese Patent No. 3080044, Dainippon Printing KK, Apr. 4, 1991, discloses a process for preserving cut apple pieces. The washed and peeled apples are cut into several pieces. The pieces are preserved in an aqueous solution of ascorbic acid and/or salt. The products are put into a package with $N_2$ gas, thus eliminating $O_2$ gas.

Japanese Patent No. 59006834, Suzuki, Jan. 13, 1984, discloses preserving fruit which tends to brown upon oxygen exposure by dipping it in salt solution and anti-browning solution, packaging it in a gas barrier film after purging the oxygen, and refrigerating. Peeled fruit is rinsed with salt solution, dipped in an anti-browning solution, placed in wrapping material having high gas-barrier properties, sealed in it after purging oxygen, and then stored under refrigeration. Salt concentration of the salt solution is 0.1 to 0.3%. The salt solution is 0.9 to 1.1% salt solution or 0.4 to 0.6% ascorbic acid solution. Peeled fruit with any defective parts removed can be stored for a long time, e.g. a few months, without browning. The fruit may be, for example, apples, pears, persimmons, etc., the flesh of which tends to discolour on contact with oxygen. By rinsing the fruit with the salt solution, brown colour causing substances, e.g. diphenol compounds, are removed from the surface. The anti-browning solution may be a mixture of 0.2 to 0.4% salt solution and 0.4 to 0.6% ascorbic acid solution, or it may be 0.01 to 0.03% solution of sodium hydrogen sulphate, etc. The dipping is performed for 30 seconds and the liquid temperature is kept at 5 to 10° C. The wrapping material may be, for example, nylon film. Oxygen purging may be performed either by vacuuming or $N_2$ gas substitution.

SUMMARY OF THE INVENTION

This invention relates to a novel method of preparing and preserving fresh, vitaminized, flavoured or unflavoured cut apple pieces to be stored in specified gas permeable containers for extended periods of time of up to 6 weeks without appreciable loss of apple flavour, development of off-flavour and brown coloration, and with retention of high levels of ascorbic acid, adjunctive flavour, and textural crispness, crunchiness and firmness.

The method in one aspect consists of sequential impact process steps including: (1) washing of whole apples with chlorinated water to sanitize the peel surfaces; (2) coring and cutting the peeled or unpeeled apples into pieces of suitable size and shape; (3) immersing the pieces in a 5 to 15% ascorbic acid solution to attain an ascorbic acid level of between 200 and 600 mg per 100 grams of apple juices (erythorbic acid solution may be used if vitaminization is not desired); (4) removal of portion-excess of solution from the surfaces of the pieces by vibrational and/or high-velocity gas impingement operations with a residual surface-liquid of 0.5 to 4.0 grams per 100 square cm.; (5) optionally, atomization of a selected liquid adjunctive flavour ingredient (flavourant) for deposition of droplets onto the surfaces of the cut apple pieces, which may be in a container or which may be destined for a container; (6) introduction of a specific gas mixture into the headspace of the container, having specified gas barrier properties; (7) quick-chilling of cut apple pieces in the sealed container to temperatures of 0 to 4° C. for 24 hours; and (8) storage of the packaged cut apple pieces at refrigerated temperatures between 0 and 10° C.

The invention is directed to a method of preserving fresh apple pieces comprising: (a) sanitizing the surfaces of whole apples with a suitable sanitization agent; (b) coring and cutting the apples into pieces; (c) immersing the apple pieces in an acid solution containing between about 5 to about 15% weight ascorbic acid; (d) removing excess solution from the surfaces of the apple pieces; (e) optionally depositing a flavouring on the surfaces of the apple pieces; (f) placing the flavoured or unflavoured apple pieces in a container; (g) introducing a specific gas mixture into the headspace; (h) quick-chilling the apple pieces in a container; and (i) storing the container of apple pieces at a temperature between about 0° C. and about 10° C. The sanitized whole apples can be peeled before being cored and cut into apple pieces.

The solution containing only ascorbic acid must have a pH between about 2.2 and about 2.7. During immersion in the ascorbic acid solution, the apple pieces must attain ascorbic acid levels of between 200 and 600 mg per 100 grams of apple pieces. The portion-excess solution must be removed from the surfaces of the apple pieces by vibration and/or by high velocity gas impingement. The level of residual surface-liquid must be between 0.5 to 4.0 grams per 100 sq. cm. of surface area.

The adjunctive flavouring ingredient (flavourant) can be atomized and deposited as droplets on the surfaces of the cut apple pieces. The flavourant must be liquid and may have flavour characteristics such as cinnamon, raspberry, peach and peppermint. The apple pieces can be placed in a container before being sprayed with flavourant or the flavourant may be sprayed on apple pieces before falling into containers.

A equilibrium headspace microatmosphere of the container containing the apple pieces can comprise a gas mixture having a carbon dioxide content between about 5 and 20% volume and having oxygen at a concentration of about 1 to about 6% volume.

The apple pieces in a container can be quick chilled to a temperature between about 0° C. and about 4° C. The quick chilled apple pieces can be held at a temperature of between about 0° C. and about 4° C. for 24 hours before being stored at a temperature between about 0° C. and about 10° C.

Erythorbic acid can be substituted for ascorbic acid.

The wall of a container can have gas permeabilities of 50 to 300 cu. cm. of oxygen per 100 sq. ins. per 24 hrs. @ 25° C. at 1 atm. and 200 to 1200 cu. cm. of carbon dioxide per 100 sq. ins. per 24 hrs. @ 25° at 1 atm.

In another aspect, the invention is also directed to a method for prolonging the fresh fruit characteristics of apples comprising: (a) washing the peeled surfaces of whole apples with chlorinated water to sanitize the peel surfaces; (b) coring and cutting the sanitized peeled or unpeeled apples into pieces of suitable size and shape; (c) immersing the apple pieces in a 5 to 15% ascorbic acid solution with a pH value between about 2.2 and 2.7; (d) removing portion-excess of solution from the surfaces of the pieces by vibrational or high-velocity gas impingement; (e) optionally, atomizing a selected liquid adjunctive flavour ingredient for deposition of atomized droplets of flavour ingredient onto the surfaces of the apple pieces; (f) placing the apple pieces in a container; (g) introducing a preservation gas mixture into the headspace of a container which has specified gas barrier properties; (h) quick-chilling the apple pieces in the sealed container to temperatures of between 0 and 4° C. for 24 hours; and (i) storing the packaged cut apple pieces at a refrigerated temperature between about 0 and 10° C.

Erythorbic acid can be substituted for ascorbic acid. The apple pieces can be placed in a container before they are treated with atomized flavour ingredient.

DETAILED DESCRIPTION OF PREFERRED EMBODIMENTS OF THE INVENTION

This method is a combination process and is based on the novel concepts and experimental results with particular focus on:

(a) Immersion of cut apple pieces in low pH (2.2 to 2.7) solutions with high concentration levels (5 to 15%) of only ascorbic acid, as the acidulant and the reducing agent, for a short period of time (about 30 seconds to 3 minutes) for the purpose of: (1) diffusing ascorbic acid into apple tissue to levels of 200 to 600 mg per 100 grams of cut apple pieces for vitamin C supplementation, inhibition of enzymatic browning and decrease of the oxidation-reduction potential to impede the growth of spoilage organisms such as Acetobacter, yeast and mold; (2) dislodging spoilage organisms from the surfaces of cut apple pieces; (3) stressing the spoilage organisms on the cut surfaces by the high levels of hydrogen ions (low pH) from the ascorbic acid; and (4) removal of decompartmentalized cellular juice on the cut surfaces of the apple pieces.

(b) Prompt removal of portion-excess solution of ascorbic acid by vibration of cut apple pieces and/or by high-velocity gas impingement on the surfaces of cut apple pieces to bring about a range of specific residual surface-liquid levels of 0.5 and 4.0 grams per 100 grams of apple pieces for the purpose of: (1) prevention of the water-logging of tissue (inward movement of excessive amounts of ascorbic acid solution) and prevention of tissue sugar diffusion out of the tissue; (2) reducing the amount of aqueous microbial habitat on the cut apple piece surfaces to limit the total microbial biomass buildup during the storage period with the consequence of impeding microbial spoilage; (3) preventing the formation of free liquid drip at the bottom of a container.

(c) Application of liquid adjunctive flavour ingredient (flavourant) onto the just-moist surfaces of cut apple pieces by atomization of the liquid by means of a spray nozzle with the droplets having diameters of about 40 to 200 micrometers. The small droplets are to travel into the interpiece spaces for uniform deposition onto the surfaces of the apple pieces. A spray nozzle designed for turbulent flow of the droplets will enhance the uniform deposition which ensures multi-direction infusion of the flavourant into each cut apple piece.

(d) Input of a specified gas mixture into the headspace of a container to ensure the presence of an adequate amount of oxygen for the continuance of aerobic respiration at the beginning of MAP storage and for the gradual in vivo production of respiratory carbon dioxide as a functional gas for impeding the respiration rate, ripening, senescence and microbial growth. For apple cultivars with relatively high respiration rates in the cut form, the addition of carbon dioxide to the input gas mixture may be beneficial for reducing the respiration rate and ripening at the beginning of MAP storage. The present volume of oxygen in the input gas is to be 15 to 30, and the optional carbon dioxide is to be in the mixture at levels between 0 and 15 percent by volume.

(e) Apportionment of headspace volume and product volume, being between 0.3:1 and 2:1, in containers for ensuring an adequate amount of oxygen in the headspace to maintain an aerobic microatmosphere and for creating an optimal equilibrium gas mixture in the headspace within a reasonably short storage period.

(f) Containerization of cut apple pieces in a gas-permeable plastic polymeric package having a specified range of gas permeability values required for adequate influx of air into the headspace and outflow of carbon dioxide to result in an optimum equilibrium gas microatmosphere, which is required to inhibit microbial growth, ripening and senescence, to modulate respiration, and in addition, complement the retardation of the enzymic browning by ascorbic acid. The walls of the containers are to have gas permeabilities of 50 to 300 cu. cm. of $O_2$ per 100 sq. in. per 24 hrs. at 25° C. at 1 atm., and 200 to 1200 cu. cm. of $O_2$ per 24 hrs. at 25° C. at 1 atm.

(g) Quick-chilling of the cut apple pieces in the container to temperatures of 0 to 4° C. for 24 hours for the purpose of cold shock inactivation of bacteria, which have contaminated the cut surfaces during the cutting and handling of the apple pieces. Cold shocking can inactivate many types of spoilage bacteria, particularly gram-negative organisms. Further, the quick-chilling of apple pieces will lower the respiration rate to a level at which a slow rate of carbon dioxide production occurs in the mitochondria without causing carbon dioxide stress and damage to intact apple tissue.

The strategic development of the novel method of preparing and preserving fresh, vitaminized, flavoured or unflavoured cut apple pieces was carried out by: (1) setting forth objectives as outlined in the following paragraph; (2) determining the causes of quality deterioration and spoilage in stored cut apple pieces; (3) investigating methodologies to restrict quality deterioration and spoilage events; (4) assessing methodologies for vitamin C supplementation and for the introduction of adjunctive flavour in cut apple pieces; (5) designing a scheme for incorporating and integrating functional parameters into a combination process consisting of sequential input process steps.

The objectives to be achieved through the implementation of the sequential impact process steps presented in this invention for stored, packaged, fresh, vitaminized, flavoured or unflavoured cut apple pieces are:

1. inhibition of microbial growth;
2. reduction of respiration rate;
3. retardation of ripening and senescence;
4. restriction of tissue discolouration even after the product is exposed to air after opening the container;
5. inhibition of off-flavour development;
6. retention of naturally-occurring apple flavour;
7. absorption of adjunctive flavour components by tissue;
8. retention of original crispness;
9. retardation of drip formation;
10. increase in vitamin C;
11. prevention of the development of carbonated taste (fizziness); and
12. restriction of tissue water-logging.

A major cause of quality deterioration and spoilage of stored cut fruit pieces is the growth of microorganisms in the exuded apple juice released at the cut surface areas. Our study indicated that about 0.8 grams of decompartmentalized cellular free juice per 100 square centimeters of cut surface areas reside on the surfaces of apple pieces just after cutting. Microorganisms that can grow in apple juice are yeasts, molds, lactic acid bacteria and acetic acid bacteria. To retard the growth of these organisms and impede quality deterioration and spoilage of cut apple pieces, antagonic extrinsic conditions must be imposed. Yeasts, molds, lactic acid bacteria and acetic acid bacteria can be stressed by exposure to pH levels below 2.8 and have restricted growth. Aerobic yeasts, aerobic molds, gram-positive aerotolerant anaerobic lactic acid bacteria and gram-negative aerobic acetic acid bacteria have specific oxygen requirements. Yeasts, molds and acetic acid bacteria generally will not grow in the absence of oxygen in the microatmosphere whereas lactic acid bacteria, although being anaerobes, can tolerate the presence of microatmospheric oxygen. The presence of carbon dioxide in the microatmosphere around cut apple pieces can inhibit the growth of organisms, particularly gram-negative organisms and to some extent lactic acid bacteria. Carbon dioxide is particularly most effective as a microbial antagonist at low product temperatures (0 to 6° C.) and at reduced oxygen levels. The oxidation-reduction (O/R) potential of exuded apple juice from cells is in the region of +300 millivolts, whereas the O/R potential of the acidic ascorbic acid solution is about 120 millivolts. Since yeasts and molds have optimum growth about 300 millivolts, the yeast and mold growth would be restricted in an ascorbic acid environment (O/R of about 120) on the cut apple surfaces. Further, acetic acid bacterial growth in an exuded apple juice with at least 50 mg per 100 mL of ascorbic acid can be impeded.

In this invention, with respect to microbial growth, high concentrations of ascorbic acid (5 to 15%) have been used for the purpose of: (1) lowering the pH of solution to between 2.2 and 2.7 for the purpose of stressing microorganisms and inhibiting microbial growth; (2) introducing a reducing agent solution onto the cut surfaces to bring the residing liquid to an oxidation-reduction potential level about 120 millivolts to restrict the growth of yeasts, molds and acetic acid bacteria in particular and also lactic acid bacteria; and (3) introducing a reducing agent solution into apple tissue to restrict enzymatic browning and to increase the vitamin C content with ascorbic acid levels between 200 and 600 mg per 100 grams of cut apple pieces.

Further, portion-excess liquid was removed in this invention to impede the growth of microorganisms. Our research results indicated that slime producing organisms grew on stored cut apple pieces when large amounts of aqueous phase resided on the apple piece surfaces after immersion in the ascorbic acid solution.

In addition, an equilibrium modified atmosphere is to be sustained in the headspace of the container of cut apple pieces with a headspace gas mixture containing a carbon dioxide level between 5 and 20% and an oxygen level in the range of 1 to 6%. The low oxygen and high carbon dioxide levels in the equilibrium modified atmosphere of the headspace of a container holding cut apple pieces inhibits microbial growth.

Detailed Description of Process

Raw Material

Fresh apples may be recently harvested or from refrigerated storage rooms with or without controlled atmosphere.

Fresh apples are to be firm, crisp, mature and flavourful, with a minimum of bruising and skin blemishes. The firmness of the edible parenchyma tissue should be above 13 pounds as measured by a pressure tester having a plunger with a diameter of 11 mm. The apple pH values should be between 3.0 and 4.0, preferably in the range of 3.1 to 3.8. The soluble solids values should be between about 9.0 and 15%.

Grading of the apples for size should be carried out to provide apple slices of similar size, weight and surface area.

Washing of Apples

Washing of apples with chlorinated (50 to 200 ppm available chlorine) water at about pH 6 is required to remove and inactivate microorganisms, and to remove foreign matter.

Mechanical washing equipment may be an immersion-tank type with flow-through mode or high pressure jet-type, or any other type which has a performance function of sanitizing the apple surfaces.

Coring, Peeling and Slicing of Apples

The apples may be peeled and cored, or solely cored with the intention of marketing skin-on cut apple pieces. The cut-out cores must contain most of the carpellary tissue. After coring and peeling the apples, they should be sliced immediately to prevent the onset of browning. Coring and slicing or peeling, coring and slicing the apples may occur in one operation unit.

Each cored, peeled apple or cored apple is to be sliced into a number of equal-size pieces, the most common being 8, 10, 12 and 14 pieces per apple. The apple pieces are to be inspected for quality defects. The cut apple pieces may be sprayed briefly with water prior to the ascorbic acid immersion process step, but excessive water wash will cause an increase in the water content of apple slices and will reduce the amount of ascorbic acid infused per unit time into the apple pieces during the immersion process step.

Immersion of Cut Apple Pieces in an Ascorbic Acid Solution

Apple pieces are to be immersed in a 5 to 15% ascorbic acid solution at 1° C. to 20° C. for periods of 30 seconds to 3 minutes for the purpose of: (1) diffusing ascorbic acid into the tissue to levels of 200 to 600 mg per 100 grams of cut apple pieces; (2) dislodging spoilage organisms from the surfaces of the cut apple slices; (3) stressing the spoilage organisms on the cut surfaces with the ascorbic acid solution having a low pH (2.2 to 2.7); (4) decreasing the oxidation-reduction potential of the fluid on the surfaces of apple pieces to about 120 millivolts from about 300 millivolts for the exuded apple juice from cells on the apple piece surfaces and of the cytoplasmic fluid in the intact cells in apple tissue.

The amount of ascorbic acid diffused into each cut apple piece is dependent upon the ascorbic acid concentration of the solution, the solution temperature, the time duration of immersion and the cut surface area of each apple piece. These parameters must be considered in designing an immersion process regime to achieve the desirable functional levels of 200 to 600 mg per 100 grams in apple pieces prior to storage.

A low temperature (1 to 8° C.) immersion solution may be desirable to lower the temperature of cut apple pieces prior to packaging and contribute to the growth inhibition of spoilage organisms through cold shocking.

Removal of Excess Ascorbic Acid Solution on the Surfaces of Cut Apple Pieces

After the immersion process step, a portion-excess of ascorbic acid solution is to be removed from surfaces of cut apple pieces. The portion-excess of solution is defined as the to-be-removed liquid amount above a specified amount of residual surface-liquid per square unit of surface area by physical means. The range of specific residual surface-liquid levels is to be from 0.5 to 4.0 grams per 100 square centimeters of surface area.

A portion-excess of the ascorbic acid solution is to be removed by vibrational and/or gas impingement operations. Vibration of the cut apple pieces will cause detachment of some of the loosely-held liquid from the surfaces. Equipment for the vibration operation may be a dewatering shaking table. The gas impingement operation involves the directional flow of high velocity gas onto the cut apple pieces to cause detachment of a portion of liquid from the surfaces. Air knives may be used to dispense a high velocity gas (e.g. air or nitrogen) over the surfaces of cut apple pieces.

The determination of the residual surface-liquid level can be carried out as follows:

1. gently pressing the surfaces of a specific number of cut apple pieces onto water-absorbent paper such as hand paper towel or filter paper;
2. measuring the weight of the paper before and after apple piece pressing (weight of residual surface-liquid);
3. measuring the total surface area of the cut apple pieces; and 4. calculating the weight of residual surface-liquid per 100 square centimeters of surface area.

Application of Liquid Adjunctive Flavour Ingredient onto Cut Apple Pieces

Cut apple pieces are to be flavoured by depositing liquid droplets of an adjunctive flavour ingredient (flavourant) onto the just-moist surfaces. During storage of the sealed containers, the flavour components will migrate into the apple tissue to create flavourful apple pieces. In the atomization process step, the flavour ingredient droplets are formed by a spray nozzle orifice and any supplemental operations for droplet size reduction. The spray nozzle is to be directed towards the cut apple pieces when they are in a container or destined to a container (e.g. falling through a filling chute).

A specific volume of a flavour ingredient is applied to each specific quantity of cut apple pieces per container in the form of very small droplets (mist) with diameters between about 40 to 200 micrometers.

If the cut apple pieces have a pleasant, naturally-occurring apple flavour, and would be consumer-appealing as such without an added adjunctive flavour, the process steps of adjunctive flavour addition may be omitted.

Gas Flush Mixture and Headspace Volume

For the gas flushing of cut apple pieces in containers, a gas mixture containing oxygen, inert gases (nitrogen, argon, helium) and carbon dioxide as an optional functional gas is introduced into the headspaces prior to sealing. The inert gases act as bulking agents for the uniform distribution of oxygen in the headspaces and as a diluting agent to prevent oxygen toxicity in the apple tissue. Inert gases prevent the cave-in of containers when the oxygen in the gas mixture is converted to carbon dioxide in the tissue.

The percent volume of oxygen in the input gas mixture is to be in the range of 15 to 30. The percent level of oxygen to be designated in the mixture is dependent on the ripeness, respiration rate and the apple cultivar. The optional gas, carbon dioxide, may be present in the gas mixture at levels between 0 and 15 percent by volume. The input carbon dioxide gas can be functional, particularly at the beginning of storage, as an antimicrobial agent and as a metabolic reaction-inhibitor in the apple tissue, in particular for restricting the respiration rate and ripening.

Apportionment of headspace volume and product volume is to be between 0.3:1 and 2:1

Gas Permeability of the Container

The container for cut apple pieces may be a flexible plastic bag or a semi-rigid plastic cup or tray with a top web of plastic film. The walls of the containers are to have a specific range of gas permeabilities for apportioning air into the container by differential (gradient) diffusion and for allowing differential (gradient) diffusion of $CO_2$ out of the container. As storage time proceeds, the headspace gas composition stabilizes as a gas equilibrium is established.

For containers holding 4 ounces to 20 pounds of cut apple pieces, the walls of the containers must have gas permeabilities of 50 to 300 cubic centimeters of $O_2$ per 100 square inches per 24 hours at 25° C. at 1 atmosphere, and 200 to 1200 cubic centimeters of $CO_2$ per 100 square inches per 24 hours at 25° C. at 1 atmosphere.

The influx of air as governed by the differential gas gradient is required to ensure the maintenance of an aerobic microatmosphere, which is necessary for modulated aerobic respiration, with the production of in situ carbon dioxide, for inhibition of off-flavour development, and for naturally-occurring apple flavour retention. The equilibrium modified atmosphere in the headspace of the containers should have an oxygen content of between 1 to 6%.

The outflow from the container of carbon dioxide as governed by the differential gas gradient is essential to ensure that the headspace gas equilibrium is maintained and the carbon dioxide level does not exceed 25%, with higher levels contributing to fizziness (carbonated taste) of the cut fruit pieces. The equilibrium modified atmosphere in the headspace of the containers should have a carbon dioxide content of between 5 and 20%.

The rate of air influx and carbon dioxide outflow is dependent upon the differential gas gradient and gas permeabilities of the container walls and top wall. Since a temperature abuse of the cut apple pieces may occur during product distribution and retailing, consideration of increased rate of respiration must be incorporated into the design of the package system and the gas permeability specifications.

EXAMPLE 1

Preparation and Preservation of Fresh, Intrinsic-flavoured, Vitaminized Cut Apple Pieces (Granny Smith) as a 908 g. (2 lbs.) Pack Granny Smith apples, previously stored for about 8 months under controlled atmosphere, were selected on the basis of no surface blemishes, a firmness pressure of about 17 lbs., no internal physiological injury and acceptable flavour attributes.

The apples were washed in a 150 ppm available chlorine solution (pH 5.5) for 3 minutes and dried with high velocity air. Each apple was cored and sliced into 10 equal-size, unpeeled pieces with a sanitized corer/cutter. The average weight of an apple piece was about 13 grams.

Cut apple pieces were immersed in a 10% w/v ascorbic acid solution (pH 2.36) at about 18° C. for 2 minutes and drained/shaken to remove loosely held solution. The portion-excess solution was removed by high velocity air impingement on the apple pieces from air knives. The average residual surface-liquid was about 1.4 grams per 100 sq. cm. of surface area.

About 908 grams (2 lbs.) of apple pieces were placed in a pouch constructed with 4 mil polyethylene-type film. The dimensions of the pouch were 24.5 cm. by 31 cm. The input headspace gas mixture consisted of 26% oxygen, 5% carbon dioxide and 69% nitrogen. The heat-sealed pouches were placed in an air blast refrigerated room at about 2° C. for 24 hours. The packaged cut apple pieces were stored for periods of (1) up to a total of 40 days at about 2° C. and (2) up to a total of 32 days, including 4 days at 2° C., and the remaining storage days at about 5.5° C. (representing temperature abuse at the distribution level).

The analytical results are presented in Tables 1 and 2. As noted in Table 1, the cut apple pieces stored at only 2° C. retained acceptable quality up to 40 days at which time the microbial counts were very low. With respect to the temperature abused cut apple pieces (Table 2), acceptable quality was retained up to day 32 at which time the microbial counts were moderately low. All of the samples retained their firmness and crispness, as well as Granny Smith intrinsic apple flavour. No spoilage off-flavour was perceived in the stored samples. The initial ascorbic acid content of the cut apple pieces was about 430 mg per 100 grams of pieces.

After opening the container, the apple pieces retained the original whiteness without any enzymatic browning for at least one week at about 1° C. to 6° C.

TABLE 1

Chemical, Microbiological and Sensory Analysis of Stored, Fresh Cut Apple Pieces (Granny Smith) as a 908 gram (2 lbs.) Pack at 2° C.

| Storage Time | Gas Composition | | Chemical Analysis | | Microbiological Analysis (CFU/mL) | | Overall Accept- ability[a] |
|---|---|---|---|---|---|---|---|
| (Days) | % $CO_2$ | % $O_2$ | pH | Brix | Total Plate Count | Yeasts and Molds | (1–5) |
| 0 | 5.00 | 26.00 | | | | | [b] |
| 4 | 6.54 | 16.61 | | | | | — |
| 11 | 8.26 | 6.33 | 3.28 | 10.6 | 1,585 | 1,590 | 4.0 |
| 18 | 9.38 | 1.41 | 3.26 | 10.1 | 0 | 100 | 3.6 |
| 25 | 9.71 | 1.39 | 3.23 | 11.0 | 430 | 670 | 3.7 |
| 32 | 9.07 | 1.38 | 3.24 | 10.0 | 3,210 | 3,080 | 3.4 |
| 40 | 10.03 | 1.53 | 3.23 | 11.0 | 10,950 | 11,250 | 3.1 |

[a] 5 — highly acceptable
4 — moderately high acceptable
3 — acceptable
2 — slightly unacceptable
1 – unacceptable
[b] Cut apple pieces were highly acdeptable at 0 days with a crisp, crunchy texture (about 17 lbs. for tissue firmness) and good apple flavour. The sensory overall acceptability score was about 4. The initial ascorbic acid content was about 430 mg per 100 g. of apple pieces.

TABLE 2

Chemical, Microbiological and Sensory Analysis of Stored, Fresh Cut Apple Pieces (Granny Smith) as a 908 gram (2 lbs.) Pack at 2° C./5.5° C. Temperature Regime

| Storage Time | Gas Composition | | Chemical Analysis | | Microbiological Analysis (CFU/mL) | | Overall Accept- ability[a] |
|---|---|---|---|---|---|---|---|
| (Days) | % $CO_2$ | % $O_2$ | pH | Brix | Total Plate Count | Yeasts and Molds | (1–5) |
| 0 | 5.00 | 26.00 | | | | | [b] |
| 4 | 6.54 | 16.61 | | | | | — |
| 11 | 11.42 | 1.41 | 3.27 | 9.4 | 765 | 1,030 | 3.5 |
| 18 | 11.63 | 1.49 | 3.30 | 9.6 | 12,000 | 24,050 | 3.4 |
| 25 | 14.04 | 1.51 | 3.21 | 10.8 | 198,000 | 245,500 | 3.4 |
| 32 | 11.96 | 1.39 | 3.27 | 10.2 | 525,000 | 445,000 | 3.5 |

[a] 5 — highly acceptable
4 — moderately high acceptable
3 — acceptable
2 — slightly unacceptable
1 – unacceptable
[b] Cut apple pieces were highly acdeptable at 0 days with a crisp, crunchy texture (about 17 lbs. for tissue firmness) and good apple flavour. The sensory overall acceptability score was about 4. The initial ascorbic acid content was about 430 mg per 100 g. of apple pieces.

EXAMPLE 2
Preparation and Preservation of Fresh, Intrinsic-Flavoured, Vitaminized Cut Apple Pieces (Fuji) as a 227 gram (8 oz.) Pack Fuji apples, previously stored for about 6 months under controlled atmosphere, were selected on the basis of no surface blemishes, a firmness pressure of about 14 lbs., no internal physiological injury and acceptable flavour attributes.

The apples were washed in a 150 ppm available chlorine solution (pH 5.5) for 3 minutes and dried with high velocity air. Each apple was cored and sliced into 10 equal size, unpeeled pieces with a sanitized corer/cutter. The average weight was about 13 grams.

Cut apple pieces were immersed in a 10% w/v ascorbic acid solution (pH 2.36) at about 18° C. for 2 minutes and drained/shaken to remove loosely held solution. The portion-excess solution was removed by high velocity air impingement on the apple pieces from air knives. The average residual surface-liquid was about 1.4 grams per 100 sq. cm. of surface area.

About 227 grams (8 ounces) of apple pieces were placed in a pouch constructed with 2.5 mil polypropylene copolymer-type film. The dimensions of the pouch were 16 cm.×27 cm. The input gas mixture consisted of 26% oxygen, 2% carbon dioxide and 72% nitrogen. The heat-sealed pouches were placed in an airblast refrigerated room at about 2° C. for 24 hours. The packaged cut apple pieces were stored at about 2° C. total for periods up to 32 days.

The analytical results are presented in Table 3. The cut apple pieces, stored up to day 32, retained acceptable quality. The total plate counts and yeast and mold counts did not increase appreciably during the 32 day storage period. The samples retained their firmness, crispness and crunchiness, as well as their Fuji intrinsic apple flavour. The initial ascorbic acid content of the cut apple pieces was about 430 mg per 100 gram of pieces.

TABLE 3

Chemical, Microbiological and Sensory Analysis of Stored, Fresh Cut Apple Pieces (Fuji) as a 227 gram (8 oz.) Pack at 2° C.

| Storage Time | Gas Composition | | Chemical Analysis | | Microbiological Analysis (CFU/mL) | | Overall Accept- ability[a] |
|---|---|---|---|---|---|---|---|
| (Days) | % $CO_2$ | % $O_2$ | pH | Brix | Total Plate Count | Yeasts and Molds | (1–5) |
| 0 | 2.08 | 25.62 | 3.62 | 14.6 | | | 4.2 |
| 11 | 8.02 | 5.29 | 3.74 | 13.4 | 1 | 100 | 4.5 |
| 18 | 8.11 | 1.36 | 3.89 | 14.0 | 150 | 300 | 4.0 |
| 26 | 9.38 | 1.36 | 3.70 | 13.2 | 150 | 1,850 | 3.3 |
| 32 | 7.48 | 1.58 | 3.59 | 13.2 | 245 | 450 | 3.8 |

[a] 5 — highly acceptable
4 — moderately high acceptable
3 — acceptable
2 — slightly unacceptable
1 – unacceptable

EXAMPLE 3
Preparation and Preservation of Fresh, Cinnamon-Flavoured, Vitaminized Cut Apple Pieces (Granny Smith) as a 227 gram (8oz.) Pack Granny Smith apples, previously stored for about 6 months under controlled atmosphere, were selected on the basis of no surface blemishes, a firmness pressure of about 15 pounds, no internal physiological injury and acceptable flavour attributes.

The apples were washed in a 150 ppm available chlorine solution (pH 6) for 3 minutes and dried with high velocity air. Each apple was cored and sliced into 10 equal-size, unpeeled pieces with a sanitized corer/cutter. The average weight of an apple piece was about 13 grams.

Cut apple pieces were immersed in a 10% w/v ascorbic acid solution (pH 2.36) at about 18° C. for 2 minutes and drained/shaken to remove loosely held solution. The portion-excess solution was removed by high velocity air impingement on the apple pieces from air knives. The average residual surface liquid was in the vicinity of 1.4 to 2.2 grams per 100 sq. cm of surface area.

About 227 grams (8 oz.) of apple pieces were placed in a pouch constructed with 2.5 mil polypropylene copolymer-type film. The dimensions of the pouch were 16 cm by 27 cm. The input gas mixture was about 21% oxygen, 0.03% carbon dioxide and 79% nitrogen. The apple pieces in each pouch were sprayed with a liquid natural cinnamon flavour ingredient (flavourant) from an atomizer at a level of about 0.5 mL per 227 grams of pieces (the level of flavourant is dependent on the flavour-contributing strength). Each pouch was heat-sealed and placed in an airblast refrigerated room at about 2° C. for 24 hours. The packaged cut apple pieces were stored at about 2° C. totally for periods up to 32 days.

The analytical results are presented in Table 4. The cut apple pieces, stored up to day 32, retained moderately high acceptable quality with good texture and cinnamon flavour. The total plate counts and yeast and mold counts remained low throughout the storage period. The initial ascorbic acid content was about 430 mg per 100 g of pieces.

TABLE 4

Chemical, Microbiological and Sensory Analysis of Stored, Fresh, Cinnamon-Flavored Cut Apple Pieces (Granny Smith) as a 227 gram (8 oz.) Pack at 2° C.

| Storage Time | Gas Composition | | Chemical Analysis | | Microbiological Analysis (CFU/mL) | | Overall Accept-ability[a] |
|---|---|---|---|---|---|---|---|
| (Days) | % $CO_2$ | % $O_2$ | pH | Brix | Total Plate Count | Yeasts and Molds | (1–5) |
| 0 | 5.00 | 26.00 | | | | | b |
| 11 | 8.48 | 2.10 | 3.29 | 10.0 | 100 | 100 | 4.0 |
| 18 | 9.07 | 2.38 | 3.26 | 10.2 | 100 | 4,200 | 4.5 |
| 26 | 7.29 | 2.24 | 3.22 | 10.2 | 210 | 61,500 | 4.5 |
| 32 | 6.44 | 2.43 | 3.15 | 10.2 | 1,165 | 14,000 | 4.5 |

The overall acceptability score included the cinnamon flavour evaluation.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of preserving fresh apple pieces comprising:
   (a) sanitizing the surfaces of whole apple with a sanitation agent;
   (b) coring and cutting the apples into pieces;
   (c) immersing the apple pieces in an acid solution consisting essentially of between about 5 to about 15% weight/volume of a substance selected from the group consisting of ascorbic acid and erythorbic acid, and mixtures thereof, and the remainder water, and having a pH between about 2.2 and 2.7 for about 30 seconds to about 3 minutes to produce a level of ascorbic acid of erythorbic acid, or mixtures or the two acids in the apple pieces of between about 200 to about 600 mg per hundred grams of apple pieces;
   (d) removing excess solution from the surfaces of the apple pieces to thereby retard growth of spoilage microorganisms whereby the range of specific residual surface solution on the surfaces of the apple pieces is from about 0.5 to about 0.4 grams per 100 sq. cm. of surface area;
   (e) placing the apple pieces in a liquid resistant container the walls of which have a gas permeability of 50 to 300 cu. cm. of oxygen per 100 sq. ins. per 24 hrs. @ 25° C. at 1 atm. and 200 to 1200 cu. cm. of carbon dioxide per 100 sq, ins. per 24 hrs. @ 25° C. at 1 atm.;
   (f) quick-chilling the apple pieces in a container to between about 0° C. and 4° C. for 24 hours; and
   (g) storing the container of apple pieces at a temperature between about 0° C. and about 10° C.

2. A method as claimed in claim 1 wherein the sanitized whole apples are peeled before being cored and cut into apple pieces.

3. A method as claimed in claim 1 wherein the excess solution is removed from the surfaces of the apple pieces by high velocity gas impingement.

4. A method as claimed in claim 1 including the step of depositing a flavouring on the surfaces of the apple pieces before placing the flavoured apple pieces in a container.

5. A method as claimed in claim 4 wherein the flavouring is atomized and deposited as droplets on the surfaces of the cut apple pieces.

6. A method as claimed in claim 1 wherein the container containing the apple pieces has an equilibrium headspace microatmosphere which comprises a gas mixture having a carbon dioxide concentration between about 5 and 20% volume.

7. A method as claimed in claim 1 or 6 wherein the container containing the apple pieces has an equilibrium headspace microatmosphere which comprises a gas mixture having an oxygen concentration between about 1 to about 6% volume.

8. A method as claimed in claim 4 wherein the liquid flavourant is selected from the group consisting of liquid synthetic apple flavour, cinnamon, raspberry, peach, peppermint and non-alcoholic brandy.

9. A method as claimed in claim 4 wherein the apple pieces are placed in a container before being treated with flavourant.

10. A method as claimed in claim 1 wherein erythorbic acid is substituted for ascorbic acid.

* * * * *